(12) United States Patent
Cunningham et al.

(10) Patent No.: US 11,211,963 B1
(45) Date of Patent: Dec. 28, 2021

(54) MOBILE DEVICE CASE SYSTEM

(71) Applicant: Peak Design, San Francisco, CA (US)

(72) Inventors: Joseph Cunningham, San Francisco, CA (US); Robb Jankura, San Francisco, CA (US); Matthew Thomas James, San Francisco, CA (US); Peter Dering, San Francisco, CA (US); Peter Lockett, San Francisco, CA (US); Arthur Viger, San Francisco, CA (US); Andrew Wheeler Gans, San Francisco, CA (US); Kiran Malladi, San Francisco, CA (US); Max A. Maloney, San Francisco, CA (US); Dane Jones, San Francisco, CA (US); Colin Maginnis, San Francisco, CA (US); Rachel Roberts, San Francisco, CA (US); Jaimee Erickson, San Francisco, CA (US); Adrienne Rowell, San Francisco, CA (US)

(73) Assignee: Peak Design, San Francisco, CA (US)

( * ) Notice: Subject to any disclaimer, the term of this patent is extended or adjusted under 35 U.S.C. 154(b) by 0 days.

(21) Appl. No.: 17/071,961

(22) Filed: Oct. 15, 2020

(51) Int. Cl.
*H04B 1/3888* (2015.01)
*H04M 1/04* (2006.01)
*H04M 1/02* (2006.01)

(52) U.S. Cl.
CPC ......... *H04B 1/3888* (2013.01); *H04M 1/0202* (2013.01)

(58) Field of Classification Search
CPC .................. H04B 1/385; H04B 1/3888; H04B 2001/3855; H04B 2001/3861; H04M 1/02; H04M 1/0202; H04M 1/04; H04M 1/185; G06F 1/1613; G06F 1/1628; G06F 1/163; G06F 1/1633; G06F 2200/1633; A45C 13/1069; A45C 13/30; A45C 2011/002; A45C 2011/003; A45C 2200/0516; A45C 2200/0525
See application file for complete search history.

(56) References Cited

U.S. PATENT DOCUMENTS

| | | | | |
|---|---|---|---|---|
| 8,380,264 | B2* | 2/2013 | Hung | A45C 11/00 |
| | | | | 455/575.8 |
| 9,926,953 | B2* | 3/2018 | Russell-Clarke | A45F 5/00 |
| 10,237,384 | B2* | 3/2019 | Holder | H04M 1/04 |
| 10,616,388 | B1* | 4/2020 | Lee | H04M 1/04 |
| 10,795,438 | B2* | 10/2020 | Wang | G06F 1/163 |
| 10,900,608 | B2* | 1/2021 | Ahi | A44C 5/0007 |
| 2006/0279098 | A1* | 12/2006 | Shipley | A45F 5/00 |
| | | | | 294/25 |

* cited by examiner

*Primary Examiner* — Quochien B Vuong
(74) *Attorney, Agent, or Firm* — Run8 Patent Group, LLC; Peter Miller; Leah Raddatz

(57) ABSTRACT

One variation of a device case includes a device case body: configured to accept and retain a mobile device; defining a strap receptacle; and including a first set of magnetic features arranged across a base surface of the strap receptacle. The device case further includes a strap: coupled to the device case body; configured to seat within the strap receptacle in a retracted position; configured to accept a finger of a user in a deployed position; and including a second set of magnetic features configured to transiently couple to the first set of magnetic features to drive the strap from the deployed position to the retracted position and to retain the strap within the strap receptacle in the retracted position.

1 Claim, 12 Drawing Sheets

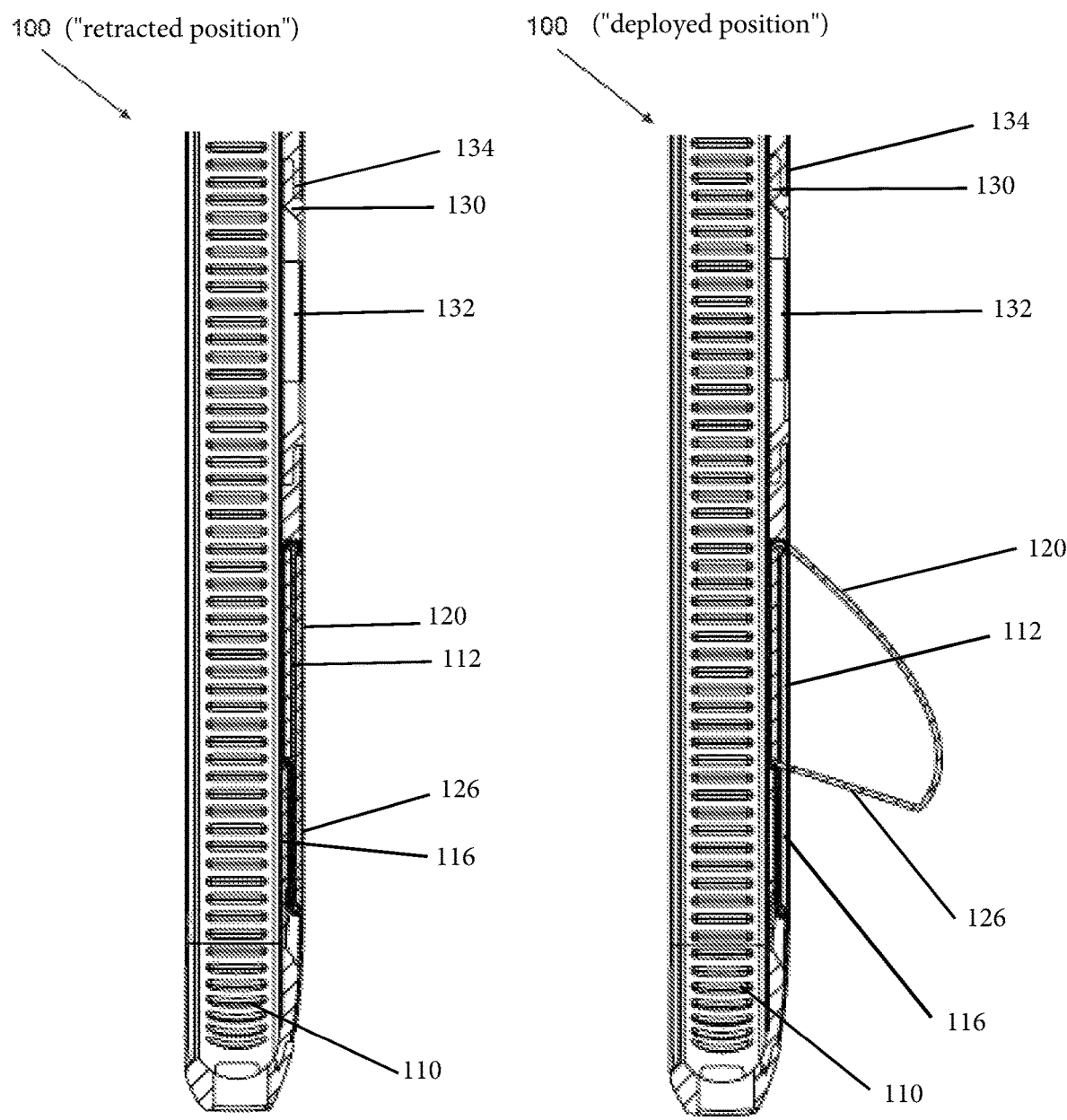

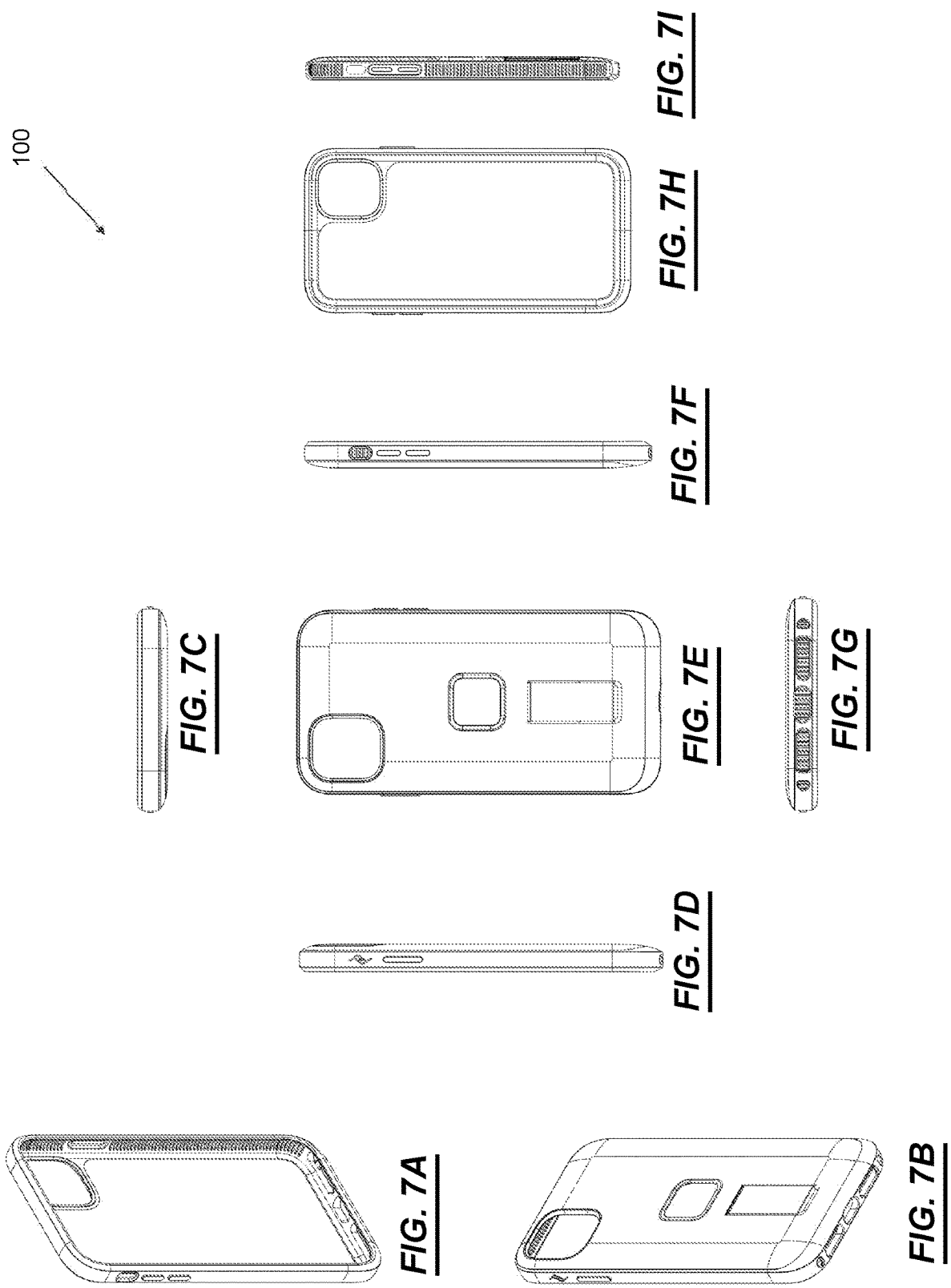

MOBILE DEVICE CASE SYSTEM

CROSS-REFERENCE TO RELATED APPLICATIONS

This Application is related to U.S. Patent Application Ser. No. 17/067,612, filed on 9 Oct. 2020, which is a continuation-in-part of U.S. patent application Ser. No. 16/945,687, filed on 31 Jul. 2020, which claims the benefit of U.S. Provisional Application No. 62/881,217, filed on 31 Jul. 2019, each of which is incorporated in its entirety by this reference.

TECHNICAL FIELD

This invention relates generally to the field of mobile device accessories and more specifically to a new and useful device case in the field of mobile device accessories.

BRIEF DESCRIPTION OF THE FIGURES

FIGS. 4A and 4B is a schematic representation of a device case;

FIGS. 7A-7I are schematic representations of a device case;

FIGS. 8A-8I are schematic representations of a device case;

FIGS. 12A-12K are schematic representations of a device case.

DESCRIPTION OF THE EMBODIMENTS

Figure 1A:
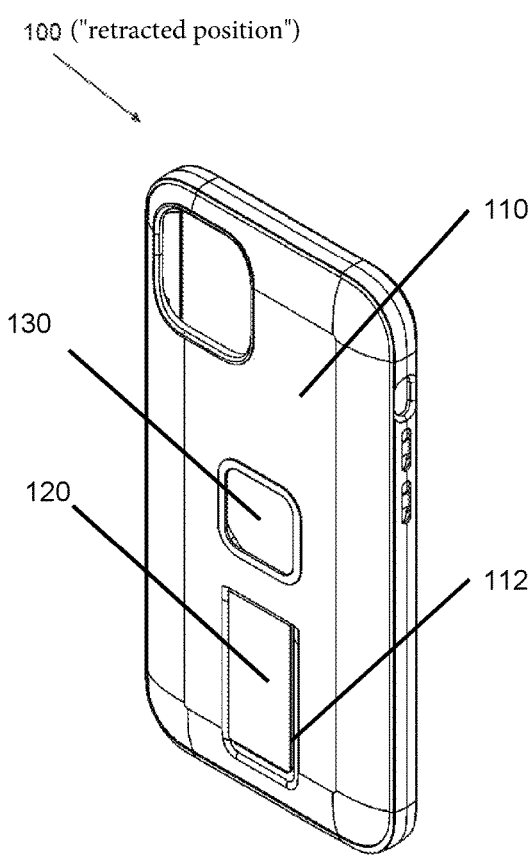
FIGS. 1A and 1B are schematic representations of a device case.
Figure 1B:
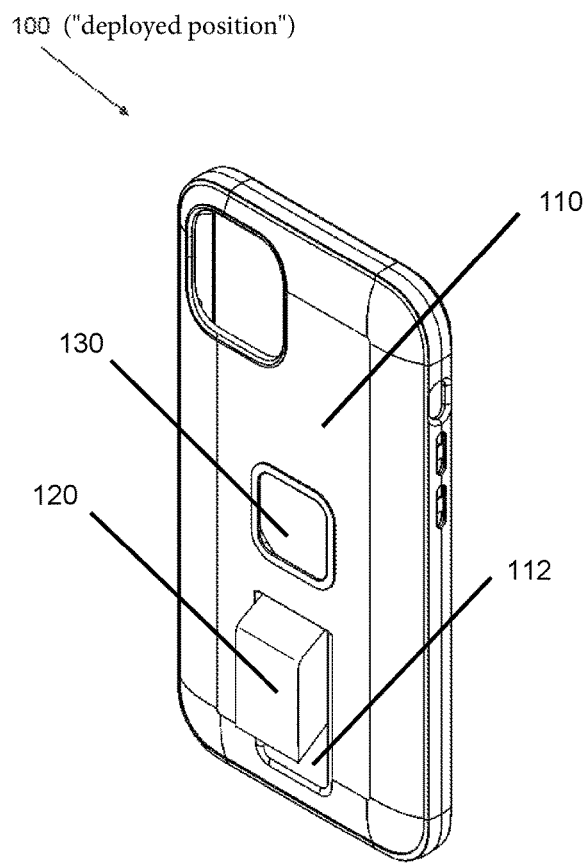
Figure 2:
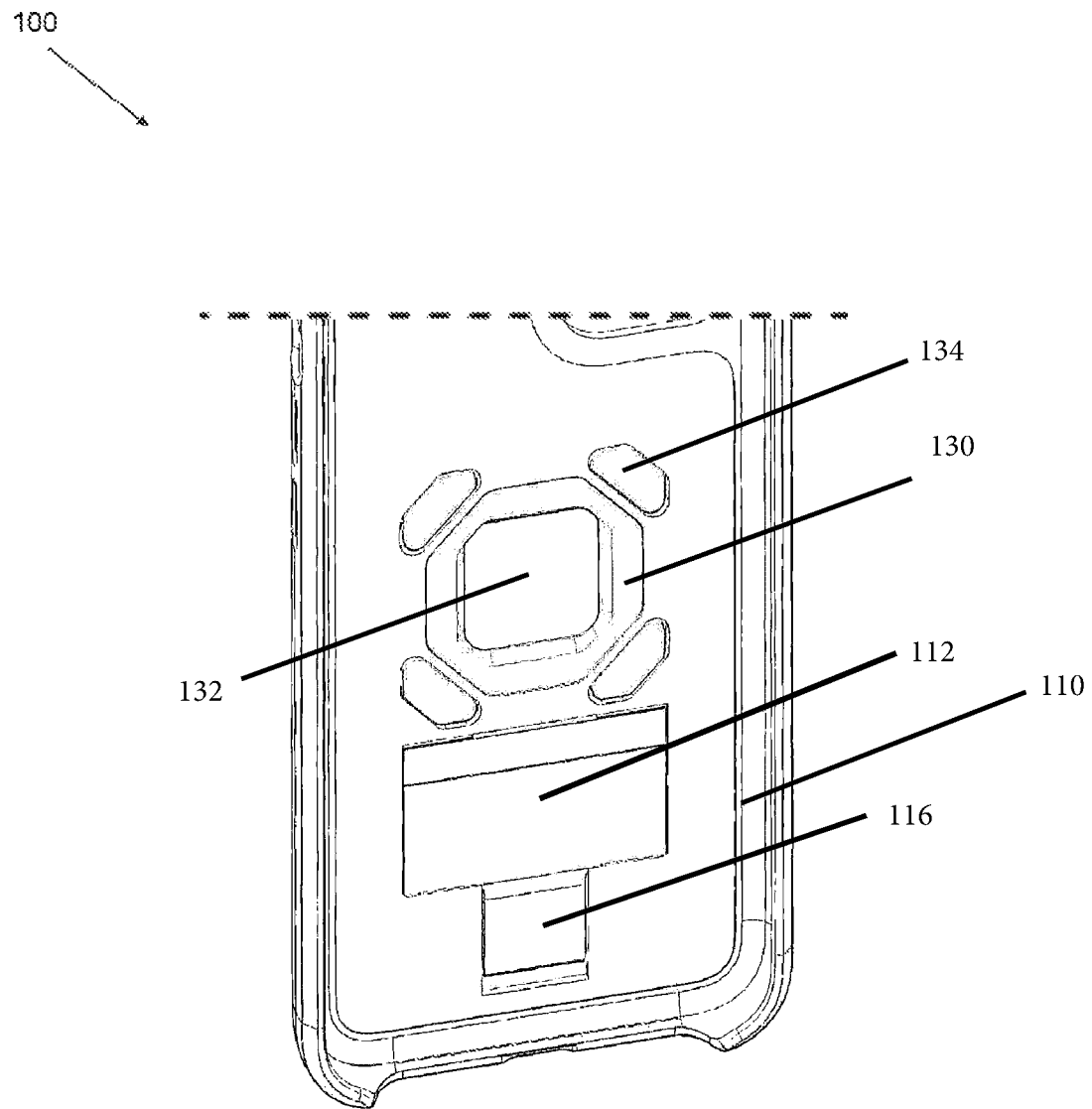
FIG. 2 is a schematic representation of a device case.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Device Case

As shown in FIGS. 1A, 1B, 3, 4A, 4B, and 7A-8I, a device case 100 includes a device case body 110: configured to accept and retain a mobile device; defining a strap receptacle 112; and including a first set of magnetic features 116 arranged across a base surface of the strap receptacle 112. The device case 100 also includes a strap 120: coupled to the device case body 110; configured to seat within the strap receptacle 112 in a retracted position; configured to accept a finger of a user in an deployed position; and including a second set of magnetic features 126 configured to transiently couple to the first set of magnetic features 116 to drive the strap 120 from the deployed position to the retracted position and to retain the strap 120 within the strap receptacle 112 in the retracted position.

In one variation shown in FIGS. 1A-6B, the device case 100 further includes: an insert 130 comprising a rectangular bore 132 configured to accept a polygonal boss of a mount to constrain the device case 100 on the mount; and a first set of magnetic elements 134 arranged in a first pattern about the rectangular bore 132 and configured to transiently couple to a second set of magnetic elements arranged in a second pattern about the polygonal boss of the mount to transiently couple the device case 100 to the mount.

2. Applications

Generally, the device case 100 includes: a device case body 110 configured to house a mobile device (e.g., a smartphone, a tablet); and a "soft" textile strap 120 coupled to the device case body 110, configured to retract into seat flush with the exterior face of the device case body 110 in a retracted position, and configured to open rearward from the device case body 110 to form a loop that accepts a finger of a user in an deployed position in order to secure the device case 100 to the use for added security when the user holds the mobile device.

In particular, the strap 120 can be configured to transition between a retracted position (e.g., stored within the device case body 110 with a first, outer section of the strap 120 resting flush with the outer surface of the device case body 110) and an deployed position in which the strap 120 forms a continuous loop extending rearward from the device case body and configured to accept the user's finger. The device case 100 can also include magnetic features configured to drive the strap 120 from the deployed position toward the retracted position and to retain the strap 120 in the close position with the first, outer section of the strap 120 resting flush with the outer surface of the device case body 110 as shown in FIG. 1A. More specifically, device case body 110: defines a strap receptacle 112 configured to house the strap 120 in the retracted position; and includes a first set of magnetic features 116 arranged across a base surface of the strap receptacle 112. The strap 120 includes: a textile loop bonded to or otherwise retained against the device case body 120 adjacent the recess; and a second set of magnetic features 126 configured to transiently couple to the first set of magnetic features 116 in the device case body 110 in order to drive the strap 120 from the deployed position to the retracted position and to retain (or "lock") the strap 120 within the strap receptacle 112 in the retracted position. The strap 120 can also include a set of stiffeners (or "structural elements") embedded in the textile loop (e.g., with the first and second sections of the strap 120) and configured to bias the textile loop (e.g., the first and second sections of the strap 120 specifically) into a planar orientation such that the strap 120 falls into a flush arrangement with the exterior face of the device case body 110 in the retracted position.

The strap defines an outer surface that seats substantially flush with an exterior face of the device case body in the retracted position. For example, the device case body can define a thickness between an inner face—configured to abut the mobile device—and the exterior face of the device case body configured to enclose and shield the back surface of the mobile device. In particular, the strap receptacle 112 can define a depth approximating or slightly less than the thickness of the device case body. For example, the strap receptacle 112 can define a depth of two millimeters. The strap can be configured to seat—in the retracted position—within the strap receptacle 112 with the first and second sections of the strap 120 (i.e., the outer surface of the strap 120) approximately (e.g., within two millimeters) flush with the exterior face of the device case body such that the strap 120 does not visibly or tactilely protrude from or fall below the exterior face (i.e., the back surface) of the device case 100 and such that the exterior face of the device case 100 appears continuous, contiguous, cohesive, and smooth across its full width and height when the strap occupies the retracted position.

Furthermore, by including the first set of magnetic features 116 of the device case body 110 and the second set of magnetic features 126 of the strap 120, the device case 100: retains the strap 120 in the flush arrangement with the exterior face of the device case body 110 when not in use; but also enables a user to rapidly deploy and release the strap 120 by overcoming magnetic coupling between these magnetic features with a single finger, such as by "flicking" an edge—formed by the second and third sections of the strap 120 in the retracted position—outwardly from the device case body. The user may then insert a finger (e.g., her middle finger) into the loop formed by the strap 120 in order to mechanically constrain the device case and the mobile device to her hand. When the user later removes her finger from the loop, the first and second sets of magnetic features may magnetically couple to withdraw the strap 120 into the strap receptacle 112 and automatically retain (or "lock") the strap 120 within the strap receptacle 112.

2.1 User Example

For example, the user may wake in the morning and immediately grab her mobile phone to read her emails while reclined in her bed. To reduce hand fatigue from holding her mobile phone above her head while reclined, to increase mobile device security (i.e., by protecting the user from dropping her mobile phone), and to enable the user to easily manipulate (e.g., scroll over) the mobile phone's touch-screen with her thumb (i.e., rather than clutch the mobile phone between her thumb and other digits), the user may, in a single swift motion: slide her index finger across the exterior face of the device case body 110 (e.g., laterally across the exterior face of the device case body); catch an edge of the strap with a fingernail; "flick" the edge of the strap outwardly from the exterior face of the device case body to transition the strap into the deployed position; then slide her index finger through a loop formed by the strap; and thus quickly and easily transition to holding mobile phone with her index finger via the strap. The user may then continue holding her mobile phone solely via her index finger inserted through the loop formed by the strap—without gripping the device case body with her hand and/or other fingers—while browsing her emails with her thumb of the same hand. When the user is finished reading her emails, she may simply slide her finger out of the strap and toss her mobile phone—housed within the device case—onto her bedside table or into her backpack for later use. When the user thus removes her finger from the strap, the magnetic features of both the strap 120 and the device case body 110 cooperate to automatically and swiftly return the strap 120 to the retracted position within the strap receptacle 112.

3. Device Case Body

The device case 100 includes a device case body 110 configured to accept and retain a mobile device (e.g., a smartphone, a tablet, a smartwatch). Generally, the device case body 110: defines a strap receptacle 112 configured to transiently house a strap 120 coupled to the device case body 110; and includes a first set of magnetic features 116 configured to transiently couple to a second set of magnetic features 126 of the strap 120 to locate and retain the strap 120 within the strap receptacle 112. The device case body 110 can be configured to accept and retain the mobile device within a cavity on an inner face of the device case body 110 and retain the strap 120 within the strap receptacle 112 on an exterior face opposite the inner face of the device case body 110, such that a user may remove the strap 120 from the strap receptacle 112 to support her mobile device with one finger through the strap 120—without clutching the mobile device with the rest of her hand—and continue viewing a screen of the mobile device.

In one implementation, the device case body 110 includes: a polymer housing configured to accept and retain the mobile device within a cavity on the inner face of the device case body 110; and a strap receptacle 112 integrated into the polymer housing and configured to accept the strap 120 on the exterior face of the device case body no. The strap receptacle 112 can define a depth approximately equivalent (e.g., within ten microns) a height of the strap 120 in the retracted position, such that an outer surface of the strap 120 in the retracted position seats flush with the exterior face of the device case body 110. The device case body 110 can also include a set of textile liners overlaid the polymer housing across surfaces of the device case body 110 (i.e., across the inner face and the exterior face).

In one implementation, the device case body 110 includes the first set of magnetic features 116 including a first subset of magnetic features arranged within a first region of the device case body 110 and a second subset of magnetic features arranged within a second region of the device case body 110. The first subset of magnetic features can be configured to transiently couple to a third subset of magnetic features of the strap 120 and the second subset of magnetic features can be configured to transiently couple to a fourth subset of magnetic features of the strap 120.

For example, the device case body 110 can include the strap receptacle 112 defining an upper section and a bottom section arranged adjacent and below the upper section (e.g., with the device case body 110 in an upright position). The device case body 110 can include: a first magnet arranged within the upper section of the strap receptacle 112 along the base surface of the strap receptacle 112; and a first magnetic plate (e.g., a steel plate) arranged within the bottom section of the strap receptacle 112 along the base surface of the strap receptacle 112.

4. Strap

The device case 100 includes a strap 120 coupled to the device case body 110 and forming a loop configured to transiently accept a user's finger. The strap 120 can be rigidly coupled to the device case body 110 such that the user may insert her finger into the loop and carry both the device case 100 and her mobile device housed within the device case 100 without grasping the device case 100 with the rest of her fingers and/or hand. Generally, the strap 120 can be configured to contour about the user's finger (e.g., forming a loop around the user's finger) in an deployed position and to seat within the strap receptacle 112—an outer surface of the strap 120 approximately flush with the exterior face of the device case body 110—in a retracted position. The strap 120 can include a second set of magnetic features 126 configured to transiently couple to with the first set of magnetic features 116 of the device case body 110 to drive the strap 120 from the deployed position to the retracted position within the strap receptacle 112 and to retain the strap 120 within the strap receptacle 112 in the retracted position.

The strap 120 can be configured to: transiently seat within the strap receptacle 112 of the device case 100 in the retracted position; transition from the retracted position to the deployed position in which the user may insert her finger through the strap 120 to support the device case 100 and her mobile device housed within the device case 100; and transition from the deployed position to the retracted position when the user no longer wishes to access the strap 120. For example, the device case 100 can retain the strap 120 in the retracted position within the strap receptacle 112 while the user carries her mobile phone—housed within the device case 100—in her pocket. Later, when the user removes her mobile device from her pocket while going for a walk, she may push her finger across a rear surface of the device case 100 to remove the strap 120 from the strap receptacle 112 in the retracted position and slide her finger through the loop formed by the strap 120 in the deployed position. The user may then comfortably carry her mobile phone via her finger inserted through the loop with confidence that her mobile device is securely coupled to her finger.

4.1 Strap Sections

As shown in FIGS. 1B, 4B, 5B, 6B, and 8A-8I, the strap 120 can be configured to form a loop such that the user may insert her finger through the loop to support and/or hold her mobile device housed within the device case 100. The strap 120 can include a set of sections forming the loop, such that a first strap section couples to a last strap section to form the loop.

In one implementation, the strap 120 can include: a first section curving outwardly from the device case body 110 when the strap 120 is in the deployed position; a second section approximately parallel the device case body 110 (e.g., with curved ends) when the strap 120 is in the deployed position; a third section curving inwardly toward the device case body 110 when the strap 120 is in the deployed position. The strap 120 can also include a fourth section (or "base section"): parallel and/or coupled to the base surface of the strap receptacle 112; and coupled to the first strap section.

The strap 120 can include the second set of magnetic features 126 configured to couple to the first set of magnetic features 116 of the device case body 110. Sections of the strap 120 can be configured to include a subset of magnetic features, in the second set of magnetic features 126, such that the second set of magnetic features 126 are distributed within the strap 120 in a particular arrangement that enables coupling between the first and second set of magnetic features 126 in the device case body 110 and the strap 120 when the strap 120 is in the retracted position.

In one implementation, the strap 120 includes: a first subset of magnetic features arranged in the first strap section; a second subset of magnetic features arranged in the second strap section; and a third subset of magnetic features arranged in the third strap section. Each of these subsets of magnetic features, in the second set of magnetic features 126, can be configured to couple to magnetic features in the device case body 110. For example, the strap 120 can include: a first magnet arranged within the first strap section; a steel plate arranged within the second strap section; and a second magnet arranged within the third strap section.

The strap 120 can include a set of hinges between sections of the loop. For example, the strap can include: a first hinge between the first section of the loop and the second section of the loop; a second hinge between the second section of the loop and the third section of the loop; and a third hinge between the third section of the loop and the fourth section of the loop. In another example, the strap can include: a first hinge between the second section and the third section of the loop; and a second hinge between the third section and the fourth section of the loop. In this example, the strap includes no hinge between the first and second sections of the loop, such that the loop fits more snugly to the user's finger, while hinges between the second and third sections and third and fourth sections enable the loop to readily transition between the open and retracted positions.

In one implementation, the strap 120 can be configured to contour around the user's finger in the deployed position, such that strap 120 forms a loop around the user's finger with no (or minimal) gaps present between the strap 120 and the user's finger. Thus, in this implementation, the strap 120 can include the set of stiffeners (e.g., flexible plastic, fabric) extending between sections of the strap 120 such that these connections between sections bend and/or contour to the user's finger. For example, in the implementation described above in which the strap includes a set of four sections, each including a subset of magnetic features, in the second set of magnetic features 126, the strap can include a single stiffener extending across each section of the loop. In this example, the single stiffener can include a set of cutouts (e.g., a first cutout in the first section, a second cutout in the second section, and a third cutout in the third section) configured to house the second set of magnetic features 126 of the strap 120.

4.2 Strap Stack

As shown in FIGS. 4A and 4B, each strap section includes multiple layers. With the strap in the retracted position: the layers of the second and third sections stack to achieve a height approximating a depth of the strap receptacle 112 occupied by the second and third sections; and the layers of the first and fourth sections similarly stack to achieve a height approximating a depth of the strap receptacle 112 occupied by the first and fourth sections. In particular, in the retracted position, the stack can define a height approximately equivalent (e.g., within five microns) a depth of the strap receptacle 112 of the device case body 110 such that the outer surface of the strap 120 seats approximately flush with (e.g., within 10 microns of) the exterior face of the device case body 110.

In one implementation, the device case body includes a set of fabric liners, thus extending a thickness of the device case body. In this implementation, the strap can define a height—in the retracted position—approximately extending from the base surface of the strap receptacle 112 to an outer surface of the outer textile liner. For example, the device case body 110 can define a total thickness (e.g., between 2.0 millimeters and 3.2 millimeters) and include: an inner textile liner defining an inner liner thickness (e.g., between 0.2 millimeters and 0.3 millimeters); a polymer housing defining a housing thickness (e.g., between 1.5 millimeters and 2.5 millimeters); and an outer textile liner defining an outer textile thickness (e.g., between 0.2 millimeters and 0.3 millimeters). Thus, in this example, the strap can define a height—in the retracted position—approximating a distance between the base surface of the strap receptacle 112 and the outer surface of the outer textile liner (e.g., a depth of the strap receptacle 112 plus the outer textile thickness).

4.2.1 Stiffeners

Segments of the strap 120 can also include a set of stiffeners formed of a thin, stiff material, such as plastic (e.g., nylon sheet), spring steel (e.g., shim stock), or a stiff fabric (e.g., a nylon laminate twill). In particular, these stiffeners can: increase rigidity of the loop formed by the strap 120 and thus prevent the loop from twisting as the user slides a finger into the loop; and bias their corresponding segments of the strap into a flat, planar arrangement. In one implementation, the set of stiffeners can be formed of a flexible material (e.g., a flexible plastic, a fabric) such that the strap 120 is readily operable in both the deployed position (e.g., in a loop shape) and the retracted position (e.g., laid flat within the strap receptacle 112 of the device case body 110) and can contour to the user's finger in the deployed position. The second set of magnetic features 126 can be arranged within (e.g., flush with) the set of stiffeners. Alternatively, the second set of magnetic features 126 can seat above or below the set of stiffeners within the strap.

In one implementation, sections of the strap 120 (e.g., the first section, second section, and third section) can each include a discrete stiffener, in the set of stiffeners, such that the discrete stiffener does not extend between sections of the strap. For example, the strap 120 can define a first strap section including: a first rectangular plastic stiffener defining a first cutout (e.g., circular, rectangular) in a center of the first rectangular plastic stiffener, the first cutout and the first rectangular plastic stiffener defining a first area; and a first magnet configured to fit within the first cutout of the first rectangular plastic stiffener. The strap can also define a second strap section including: a second rectangular plastic stiffener defining a second cutout in a center of the second rectangular plastic stiffener, the second cutout and the second rectangular plastic stiffener defining a second area approximating the first area; and a first steel plate configured to fit within the second cutout of the second rectangular plastic stiffener. The strap can further define a third strap section including: a third rectangular plastic stiffener defining a third cutout in a center of the third rectangular plastic stiffener, the third cutout and the third rectangular plastic stiffener defining a third area approximating the first and second area; and a second round magnet configured to fit within the third cutout of the third rectangular plastic stiffener.

In another implementation, strap sections can include a single contiguous stiffener extending between adjacent strap sections. The single contiguous stiffener can be formed of a flexible material such that the loop contours to the user's finger. For example, the strap 120 can include a first stiffener: extending between the first strap section and the second strap section; defining a first cutout configured to seat within the first strap section; and defining a second cutout configured to seat within the second strap section. In this example, the first strap section can include a first magnetic element seated within the first cutout of the first stiffener. The second strap section can include a magnetic plate seated within the second cutout of the first stiffener. In this example, strap 120 can also include a second stiffener—discrete from the first stiffener—within the third strap section, such that the strap defines a hinge between the second and third strap sections. Therefore, the first strap section and the second strap section form a continuous strap section connected via the first stiffener with no hinge between these strap sections. Thus, when the user removes her finger from the strap 120 in the deployed position and the first magnetic element in the first strap section magnetically couples to a corresponding magnetic element in the device case body 110, the single contiguous stiffener further drives the second section of the strap 120—and the magnetic plate within the second section of the strap—toward the device case body 110 and a corresponding magnetic element with the device case body 110.

Alternatively, in one variation, the strap 120 excludes stiffeners. In this variation, the strap 120 can be formed of a material configured to enable flexibility and rigidity of the strap 120 without inclusion of the set of stiffeners. For example, the strap 120 can be formed of a pair of weighted fabrics bonded together. In this example, by excluding stiffeners from the strap 120, the strap 120 can incorporate a larger magnetic feature(s) (e.g., a thicker magnet) within the strap 120 due to the decrease in thickness from removing the stiffeners. Further, the strap 120 can exhibit more flexibility and therefore may be more comfortable to a user wearing the strap 120 around her finger.

4.2.2 Liners

The strap 120 can also include a set of textile liners encompassing the set of stiffeners to form a loop with stiff segments separated by "living" textile hinges. For example, the strap 120 can include: a set of flexible plastic stiffeners each arranged within a segment of the strap 120 (e.g., three flexible plastic stiffeners arranged in the first, second, and third segments of the strap) to increase rigidity of these sections of the loop; a first fabric layer arranged across the inner surfaces of these stiffeners and configured to transiently contact the user's finger when the strap occupies the deployed position; and a second fabric layer arranged over the stiffeners opposite the first fabric layer and cooperating with the second fabric layer to enclose the stiffeners.

4.3 Strap Assembly

As described above, the strap can be configured to include the second set of magnetic features 126, the set of stiffeners, and the set of textile liners. In one implementation, the strap can be formed by aligning the set of stiffeners—including the second set of magnetic features 126 integrated within or inserted into corresponding receptacles in the set of stiffeners. A first fabric liner can be applied to one side of the aligned set of stiffeners (e.g., underneath the set of stiffeners) and a second fabric liner can be applied to the opposite side (e.g., on top of the set of stiffeners). These two fabric liners can be bonded to one another via a heat press, thus encapsulating the set of stiffeners—and the second set of magnetic features 126—to form the strap. Additionally or alternatively, the first and second fabric liners can be stitched together and/or bonded with an adhesive along their edges and around the stiffeners.

4.4 Device Case Attachment

In one implementation, the strap 120 includes a set of wings configured to couple the strap to the device case body 110. In this implementation, the device case body 110 can define a set of apertures proximal opposing edges of the strap receptacle 112 configured to receive the set of wings. The set of wings can be configured to insert through the set of apertures and couple to the inner face of the device case body 110 to affix the strap 120 to the device case no.

For example, the strap 120 can include a set of two wings, each wing extending from opposite edges (e.g., vertical edges) of the fourth strap section. The device case body 110 can include a set of two apertures, each aperture located adjacent opposite edges of the strap receptacle 112 and configured to receive a wing of the strap 120. The inner face of the device case body 110 can also include a set of recesses configured to accept and retain the set of wings, such that each wing seats flush with the inner face of the device case body 110. Each of the two wings can include an adhesive layer applied to an inner surface of the wing configured to couple to the inner face of the device case body no. In this example, the set of two wings—extending laterally from the fourth section of the strap 120—can be: inserted through the set of two apertures from the exterior face of the device case body 120 toward the cavity of the device case body 110; seated within the set of recesses of the inner face of the device case body 110; and then bonded to the inner face of the device case body 110 (e.g., within the set of recesses) via the adhesive layer applied to the inner surface of each of the two wings. Therefore, by bonding the wings to the inner face of the device case body 110—as opposed to the exterior face of the device case body 110—the strap 120 exhibits increased pull strength and more securely retains the strap 120 to the device case body 110.

Additionally, the device case body can include a textile liner extending across the inner face of the device case body 110. This textile liner can further increase the pull strength of the strap 120 by compressing the set of wings against the inner face of the device case body 110 and therefore maintaining the adhesive layer of the set of wings in shear with the inner face of the device case body 110.

Alternatively, in another implementation, the strap 120 can be configured to insert into a set of apertures of the device case body 110 for attachment to the device case body 110. In this implementation, the strap 120 can be configured to insert through the set of apertures of the device case body 110 for bonding to the strap 120 itself. For example, a first end of the strap 120 can be inserted through a first aperture of the device case body 110 from the exterior face of the device case body 110 toward the cavity of the device case body 110. A second end of the strap 120 can be inserted through a second aperture of the device case body 110 from the exterior face of the device case body 110 toward the cavity of the device case body 110 via a second end of the strap 120. Within the device case body 110, the first and second ends of the strap 120 can be bonded to one another. By bonding the strap 120 to itself within the device case body 110, the strap 120 and the device case body 110 can cooperate to couple the strap 120 to the device case body 110 via a larger bonding surface, thereby minimizing points of failure between the strap 120 and the device case body 110. Thus, the strap 120 can more securely attach to the device case body 110.

5. Magnetic Lock

The device case 100 can include: the device case body 110 including the first set of magnetic features 116; and the strap 120 including the second set of magnetic features 126. The second set of magnetic features 126 can be configured to transiently couple to the first set of magnetic features 116 to retain the strap 120 in the retracted position within the strap receptacle 112 of the device case body 110. Therefore, these magnetic features of both the device case body 110 and the strap 120 can cooperate to retain the strap 120 within the strap receptacle 112 when the user is not actively deploying the strap 120. The first set of magnetic features 116 and the second set of magnetic features 126 can include magnetic features such as: magnetic plates (e.g., steel plates); neodymium magnets; ceramic magnets; ferrite magnets; electromagnets; ferrous elements; correlated magnets; etc.

In one implementation, the strap 120 can define a default position corresponding to the retracted position. In this implementation, the device case body 110 and the strap 120 can be configured to include the first set of magnetic features 116 and the second set of magnetic features 126 such that the strap 120 automatically seats within the strap receptacle 112 in the retracted position when the user is not physically maintaining the strap 120 in the deployed position. Alternatively, in another implementation, the device case body 110 can define a default position corresponding to the deployed position. In this implementation, the device case body 110 and the strap 120 can be configured to include the first set of magnetic features 116 and the second set of magnetic features 126 such that the strap 120 remains in the deployed position even when the user is not physically maintaining the strap 120 in the deployed position.

In one implementation, the device case body includes a magnetic feature 116 extending across a lower region of a base surface of the strap receptacle 112. In this implementation, the strap 120 includes a magnetic feature 126 arranged in a section of the strap 120 configured to transiently align with the lower region of the base surface of the strap receptacle 112 such that the magnetic feature 126 of the strap 120 is configured to transiently couple to the magnetic feature 116 of the device case body. This singular magnetic feature 126 of the strap 120 can be configured to transiently couple to the singular magnetic feature 116 of the device case body 110 to retain the strap within the strap receptacle 112 in the retracted position. However, a user may quickly and easily access the strap 120 for deployment out of the retracted position and into the deployed position by overcoming magnetic forces between the magnetic feature 116 of the device case body 110 and the magnetic feature 126 of the strap 120. Alternatively, in another implementation, the device case body can include multiple magnetic features 116 (e.g., two magnets, a magnet and a steel plate, two magnets and a steel plate), each magnetic feature 116 of the device case body 116 configured to couple to a magnetic feature 126 of the strap 126.

5.1 Magnetic Lock: Deploying the Strap

The user may remove the strap 120 from the strap receptacle 112 by applying a force to the strap 120 and/or device case body 110 that exceeds an attractive magnetic force between the second set of magnetic features 126 and the first set of magnetic features 116, thus decoupling these magnetic features of the strap 120 and the device case body 110. For example, the user may insert her finger into the strap receptacle 112 of the device case body 110 and lift the strap 120 upward out of the strap receptacle 112. In another example, the user may exert a force on a bottom portion of the strap 120 (e.g., the third strap section) and push her finger upward along the device case body 110 to deploy the strap 120 into the deployed position.

In one implementation, the device case body 110 can include an indentation along an edge of the strap receptacle 112 configured to enable the user to access and open the strap 120 from the retracted position to the deployed position. For example, the device case body 110 can include an indentation adjacent an edge of the strap receptacle 112, such that an edge of the strap 120 adjacent the indentation seats above an interior surface of the indentation. In this example, the user may slip her finger into the indentation and under the strap 120. The user may then lift her finger outward from the device case body 110 to deploy the strap 120 from the retracted position to the deployed position.

In another implementation, the device case body 110 can include a raised section extending into the strap receptacle 112, such that the strap 120 seats flush with the raised section and does not sink within the strap receptacle 112. For example, the device case body 110 can include a raised section: extending into the strap receptacle 112; defining a width less than a width of the strap receptacle 112; and defining a height less than a height of the strap receptacle 112. An outer surface of the raised section—transiently contacting the inner surface of the strap 120 in the retracted position—can be configured to seat flush with the exterior face of the device case body 110, such that the strap 120, in the retracted position, seats flush with both the outer surface of the raised section and the exterior face of the device case body 110.

Figure 3:
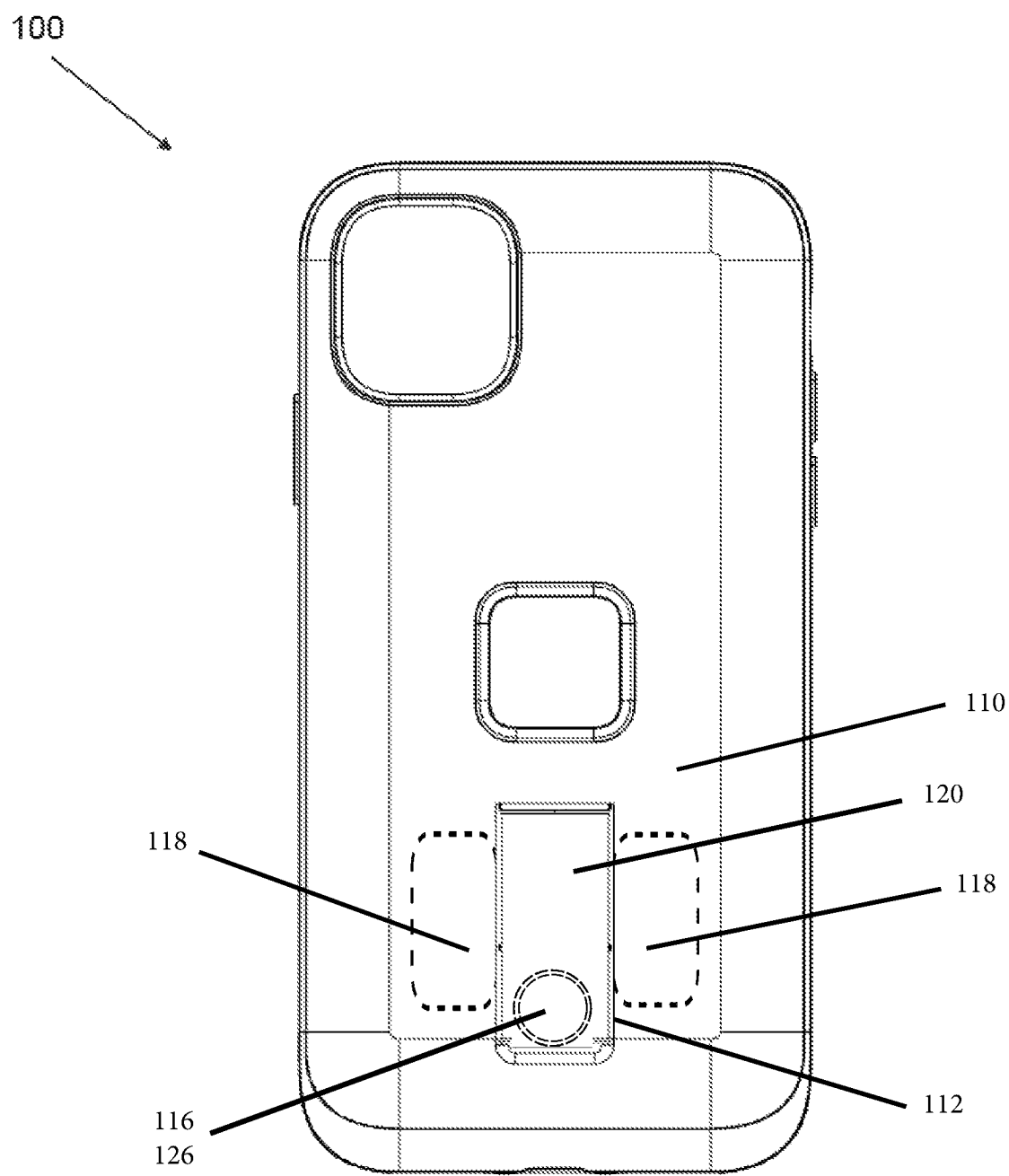
FIG. 3 is a schematic representation of a device case.
Figure 5A:
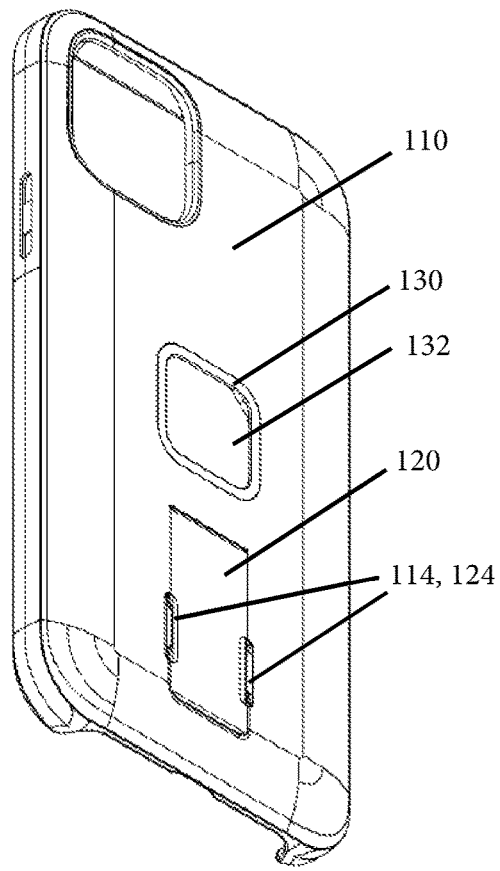
FIGS. 5A and 5B are schematic representations of a device case.
Figure 5B:
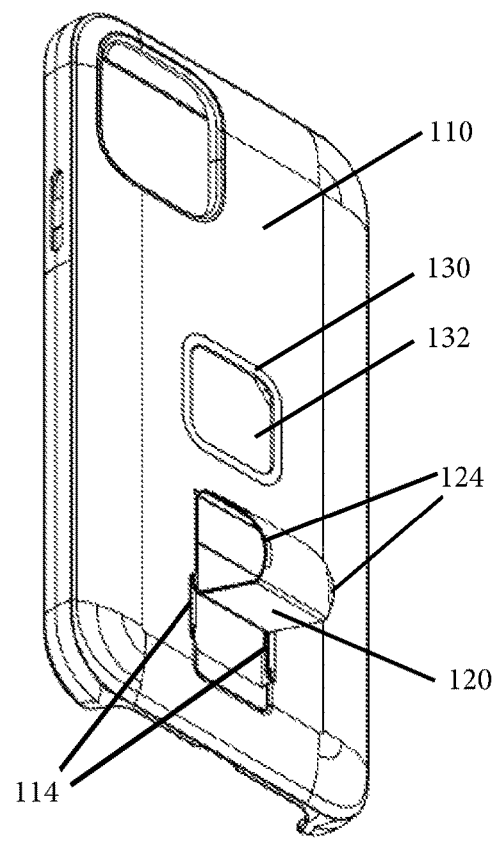

In another implementation, as shown in FIG. 3, the device case body 110 can include the strap receptacle 112 configured to house the strap 120 in the retracted position and including: a base layer defining a first depth from the exterior face of the device case body 110; and a raised layer elevated from the base layer and defining a second depth from the exterior face of the device case body 110, the second depth less than the first depth of the base layer. The raised layer can be configured such that the second depth is approximately equivalent (e.g., within two millimeters) a height of the strap 120 in the retracted position, such that the strap 120 seats flush with the raised layer and the exterior face of the device case body 110 when in the retracted position. The raised layer can include a set of secondary apertures 118 adjacent the strap 120 in the retracted position. Further, the device case body 110 can include a textile liner (e.g., an elastic textile liner) extending across the exterior face of the device case body 110, such that the exterior face appears continuous across its full width and height when the strap occupies the retracted position and the set of secondary apertures 118 are covered. In this implementation, the strap 120 can be configured to seat flush with the raised layer, above the base layer, such that the user may push her finger on a region of the textile liner aligned with a secondary aperture 118 to slip her finger underneath an edge of the strap 120 and access the strap 120 from below for deployment from the retracted position into the deployed position. Thus, the user may leverage the set of secondary apertures 118 to deploy the strap 120 from either side of the strap 120 with a single finger.

For example, the device case body 110 can include the strap receptacle 112 defining a width (e.g., between 1.8 inches and 2.5 inches) less than a width of the device case body 110 and a height (e.g., between 1.5 and 2.5 inches) less than a height of the device case body 110. The strap receptacle 112 can include the base layer defining a first depth from the exterior face of the device case body 110 and a raised layer defining a second depth less than the first depth, such that the raised layer is arranged between the base layer and the exterior face of the device case 110. In this example, the raised layer can include: a first secondary aperture 118 arranged within a first side of the base layer; a second secondary aperture 118 arranged within a second side of the base layer opposite the strap 120; and a bridge extending between the first and second secondary apertures 118 and configured to receive the strap 120. The raised layer—including the bridge—can therefore be configured to seat the strap 120 flush with the base layer and the exterior face of the device case body 110 in the retracted position.

Further, in this example, the bridge can define a width less than a width of the strap 120 such that—when the strap is in the retracted position—a first edge of the strap extends over the first secondary aperture 118 of the raised layer and a second edge of the strap extends over the second secondary aperture 118 of the raised layer. Therefore, a user may align her finger with the first secondary aperture 118 and push downward to compress the textile liner—extending across the exterior face of the device case body 110—through the first secondary aperture 118 and toward the base layer of the strap receptacle 112. The user may then slip her finger underneath the first edge of the strap—extending over the first secondary aperture 118—and lift her finger to lift the strap 120 from the retracted position into the deployed position. Similarly, the user may deploy the strap 120 from the opposite side of the strap 120 by compressing the second secondary aperture 118 downward and slipping her finger underneath the second edge of the strap 120. Therefore, the difference in depths of the raised layer and the base layer enable the user to access the strap 120 from below either side of the strap 120 with a single finger.

In this example, the textile liner extending across the exterior face of the device case body 110 can be formed of an elastic material, such that the textile liner is compressible by the user. Further, when forces (e.g., downward forces) on the textile liner are removed (e.g., when the user stops pushing downward on the textile liner), the textile liner can return to original form, flush with the exterior face of the device case body 110.

In the preceding example, the bridge formed by the first and second secondary apertures 118 of the raised layer can include a gap splitting the bridge into a first section and a second section. By splitting the bridge into two discrete sections, the strap 120 can be inserted through this gap for securing the strap 120 to the device case body 110. In particular, the raised layer of the strap receptacle 112 can include an aperture proximal a top portion of the strap receptacle 112 directly above the bridge and configured to receive a first end of the strap 120. The bridge can include the gap (i.e., an aperture) configured to receive a second end of the strap 120 and located at a set distance from the aperture above the bridge. The first end of the strap 120 can be inserted through the aperture and the second end of the strap 120 can be inserted through gap of the bridge and threaded underneath the bridge to join the first end of the strap 120. The first and second end of the strap 120 can then be bonded for securing the strap 120 to the device case body 110.

Further, in this implementation, the user may additionally access the strap 120 from a bottom of the strap 120 by exerting a force on the bottom of the strap (e.g., to overcome magnetic forces between the first set of magnetic features 116 and second set of magnetic features) and pushing her finger upward along the device case body 110. Alternatively, the device case body 110 can include an indentation in the raised layer proximal a bottom of the strap 120 in the retracted position, such that the user may insert a tip of her finger into the indentation and push upward along the device case body 110 to force the strap 120 to open into the deployed position. Therefore, the user may both access the strap 120 from the bottom of the strap 120 (e.g., with one or both hands) and from the side of the strap 120 (e.g., with a single finger).

5.2 Magnetic Lock: Returning the Strap

The second set of magnetic features 126 can be configured to transiently couple to the first set of magnetic features 116 in order to (automatically) drive the strap 120 from the deployed position to the retracted position when the user removes her finger from the loop formed by the strap 120 in the deployed position. For example, when the user removes her finger from the loop of the strap 120, the strap 120 can automatically return to the retracted position—the outer surface of the strap 120 approximately flush with the exterior face of the device case body 110—such that the user may place her phone in her pocket without the strap 120 snagging on her pocket and/or obtruding from the device case body 110.

In one implementation, in which the strap receptacle 112 includes the set of secondary apertures 118 as described above, the device case body 110 can include a magnetic feature 116 arranged directly below the bridge of the raised layer. In this implementation, the device case body 110 can include a singular magnetic feature 116 to accommodate the bridge. This singular magnetic feature 116 can be configured to transiently couple to a magnetic feature 126 arranged in a section of the strap configured to align with the magnetic feature 116 when the strap occupies the retracted position.

In another implementation, the device case body 110 can include: a first magnetic feature 116 extending across an upper region of a base surface of the strap receptacle 112; and a second magnetic feature 116 extending across a lower region of the base surface of the strap receptacle 112. In this implementation, the strap 120 can include: a first magnetic feature 126 arranged in the first strap section and configured to transiently couple to the first magnetic feature 116 of the device case body 110; a second magnetic feature 126 arranged in the second strap section; a third magnetic feature 126 arranged in the third strap section and configured to transiently couple to both the second magnetic feature 126 of the strap 120 and the second magnetic feature 126 of the device case body 110.

For example, the device case body 110 can include: a first magnet extending across the upper region of the base surface of the strap receptacle 112; and a first steel plate extending across the lower region of the base surface of the strap receptacle 112. The strap 120 can include: a second magnet arranged in the first strap section and configured to transiently couple to the first magnet of the device case body 110; a second steel plate arranged in the second strap section; and a third magnet arranged in the third strap section and configured to transiently couple to both the second steel plate of the strap 120 and the first steel plate of the device case body 110. In this example, when the user removes her finger from the loop of the strap 120, magnetic forces between the first and second magnet of the device case body 110 and the strap 120, respectively, drive the first strap section toward the strap receptacle 112 of the device case body 110. As the first strap section is pulled inward toward the strap receptacle 112, the second and third strap section are also driven closer toward the strap receptacle 112, thereby increasing magnetic forces between the first steel plate of the device case body 110 and the third magnet of the strap 120. As these magnetic forces increase, the third strap section folds down such that the third magnet of the strap 120 couples to the first steel plate of the device case body 110. The second strap section is drawn toward the third section via attraction between the second steel plate of the strap 120 and the third magnet of the third strap section.

6. Mechanical Lock

In one variation, as shown in FIGS. 5A, 5B, and 11A-12K, the device case 100 includes a set of mechanical lock features configured to retain the strap 120 in the retracted position. In this variation, the device case 100 can include the set of mechanical lock features in replacement of the first set of magnetic features 116 of the device case body 110 and the second set of magnetic features 126 of the strap 120. Generally, the device case 100 can include: the device case body 110 including a first set of snap features 114 arranged within the strap receptacle 112; and the strap 120 including a second set of snap features 124 configured to cooperate with the first set of snap 114 features of the device case body 110 to transiently retain the strap 120 within the strap receptacle 112 of the device case body 110. In this variation, when the user removes her finger from the loop formed by the strap 120, the first set of snap features 114 of the device case body 110 can prevent the strap 120 from automatically returning to the retracted position by blocking. Therefore, to return the strap 120 to the retracted position, the user may manually push (or "click") the strap 120 into the strap receptacle 112 and engage the second set of snap features 124 with the first set of snap features 114 to lock the strap 120 within the strap receptacle 112.

For example, the device case body 110 can include: a first snap feature 114 arranged adjacent a first vertical edge (e.g., corresponding to a plane defined by the device case Dm) of the strap receptacle 112; and a second snap feature 114 arranged adjacent a second edge opposite the first edge of the strap receptacle 112. The strap 120 can similarly include: a third snap feature 124 arranged adjacent a first edge of the strap 120 and configured to transiently align with the first snap feature 114 of the device case body 110; and a fourth snap feature 124 arranged adjacent a second edge of the strap 120 and configured to transiently align with the second snap feature 114 of the device case body 110. The user may push the strap 120 downward into the strap receptacle 112 (e.g., at a region corresponding these snap features) such that third and fourth snap features 124 of the strap 120 engage the first and second snap features 114 of the device case body 110, thus locking the strap 120 into the strap receptacle 112 in the retracted position.

In one variation, the device case 100 can include the set of mechanical lock features in combination with the first set of magnetic features 116 of the device case body 110 and the second set of magnetic features 126 of the strap 120.

7. Variation: Device Case+Mount

Figures 6A, 6B:
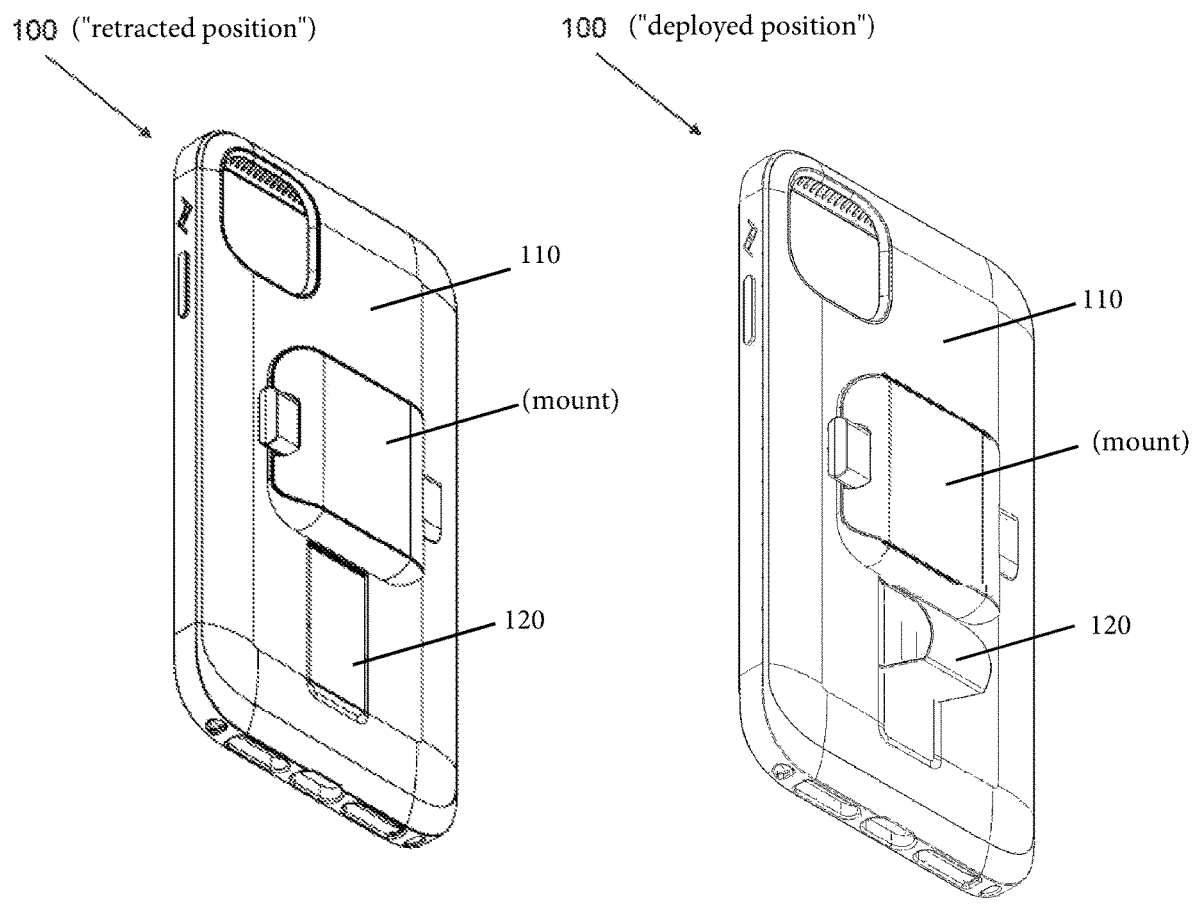
FIGS. 6A and 6B are schematic representations of a device case and mounting system.
Figure 8H:
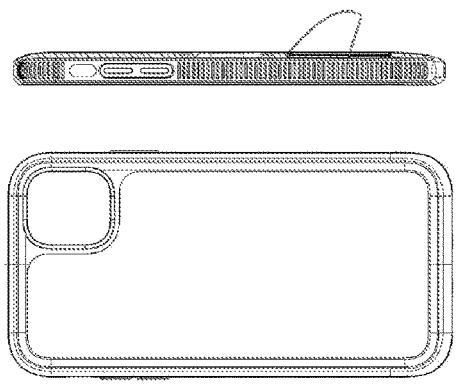
Figure 8F:
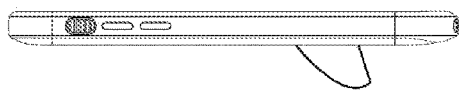
Figure 8C:
Figure 8E:
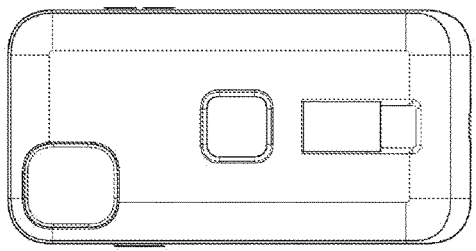
Figure 8G:
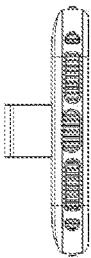
Figure 8D:
Figure 8A:
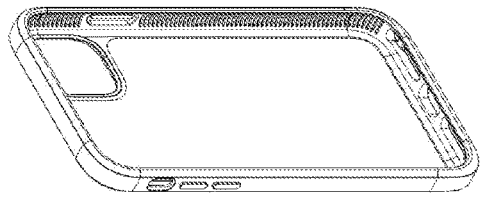
Figure 8B:
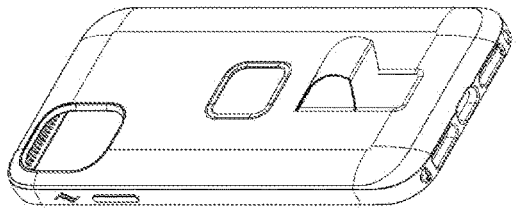
Figure 9B:
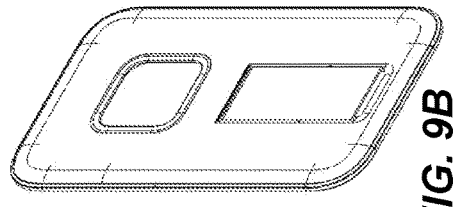
FIGS. 9A-9I are schematic representations of an adapter.
Figure 9I:
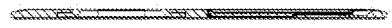
Figure 9H:
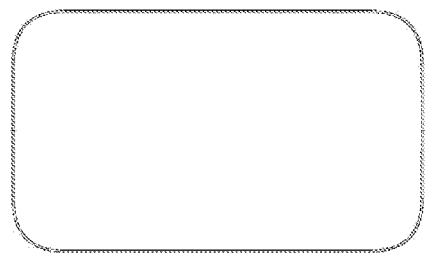
Figure 9F:
Figure 9C:
Figure 9E:
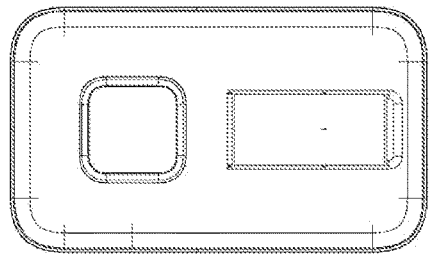
Figure 9G:
Figure 9D:
Figure 9A:
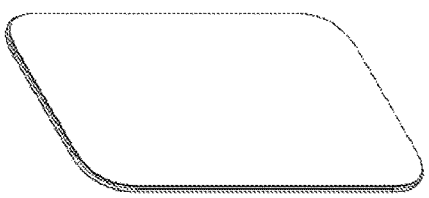
Figure 10C:
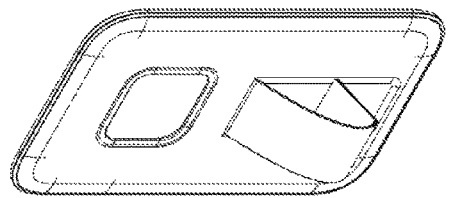
FIGS. 10A-10J are schematic representations of an adapter.
Figure 10J:
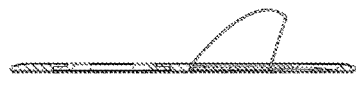
Figure 10I:
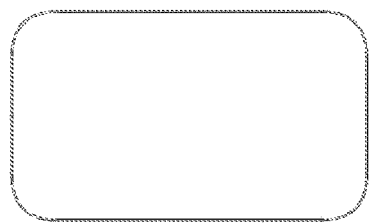
Figure 10G:
Figure 10D:
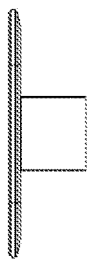
Figure 10F:
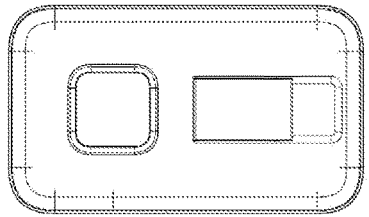
Figure 10H:
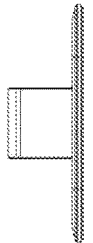
Figure 10E:
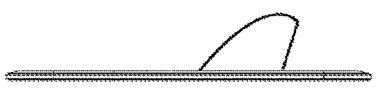
Figure 10A:
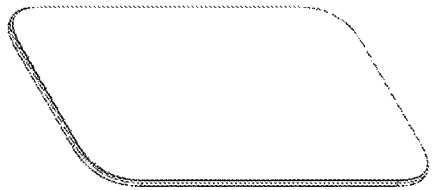
Figure 10B:
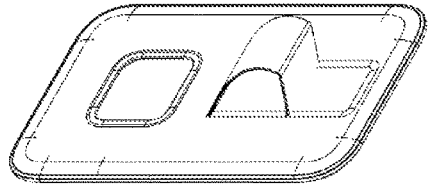
Figure 11C:
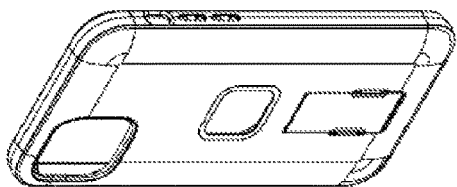
FIGS. 11A-11K are schematic representations of a device case.
Figure 11D:
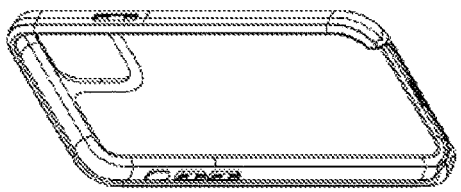
Figure 11K:
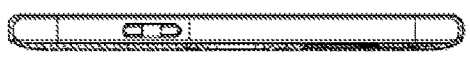
Figure 11J:
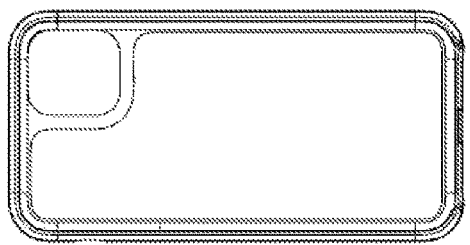
Figure 11H:
Figure 11E:
Figure 11G:
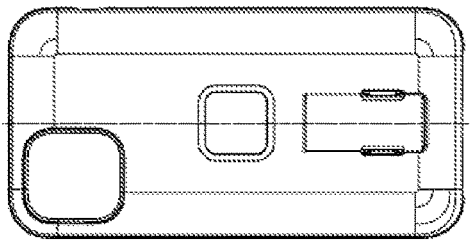
Figure 11I:
Figure 11F:
Figure 11A:
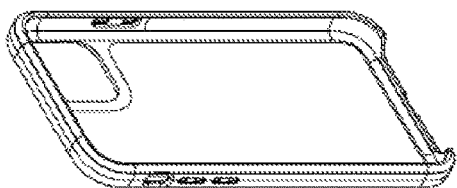
Figure 11B:
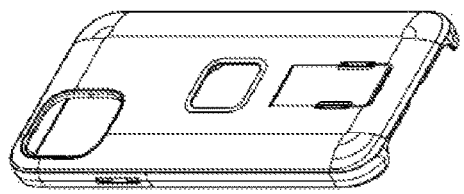
Figure 12C:
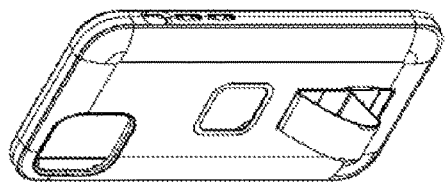
Figure 12D:
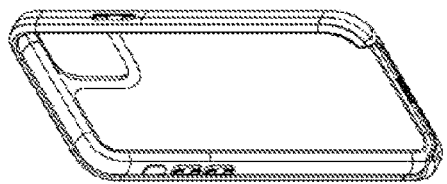
Figure 12K:
Figure 12J:
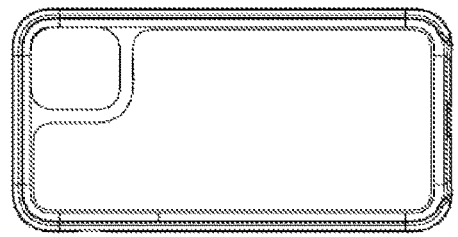
Figure 12H:
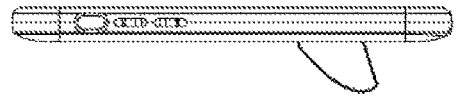
Figure 12E:
Figure 12I:
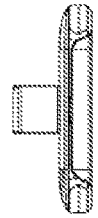
Figure 12F:
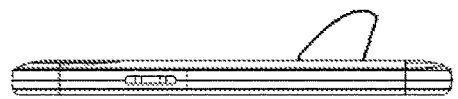
Figure 12A:
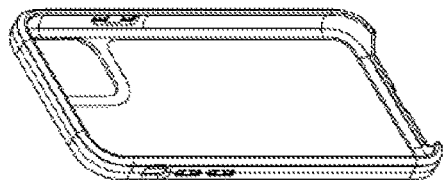
Figure 12B:
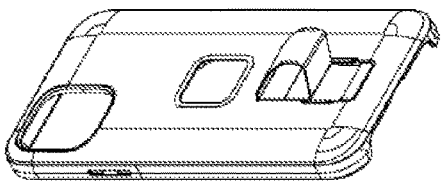

In one variation, as shown in FIGS. 6A and 6B, the device case 100 can be integrated into a mounting system—as described in U.S. patent application Ser. No. 16/945,687, filed on 31 Jul. 2020, which is incorporated in its entirety by this reference—and thus configured to couple to a set of mounts (e.g., a desk mount, a car mount, a bike mount, a tripod mount, and/or a wallet mount).

In this variation, the device case body 110 can include: an insert 130 integrated into the device case body 110 and defining a rectangular bore 132; and a first set of magnetic elements 134 arranged about the rectangular bore 132 and configured to transiently couple to a second set of magnetic elements of a mount. The device case 100 can be configured to retain a boss of the mount within the rectangular bore 132 on an exterior face of the device case 100, such that a user may couple her mobile device, within the device case body 110, to the mount in order to affix her mobile device to a particular surface and continue viewing and/or interacting with a display of the mobile device.

The device case body 110 can include the insert 130 arranged in a first region of the device case body 110 and the strap receptacle 112 arranged in a second region of the device case body 110, such that a user may: support and/or carry her mobile device—housed within the device case 100—via insertion of her finger through the loop of the strap 120 in the deployed position; remove her finger from the loop to trigger the strap 120 to transition from the deployed position to the retracted position within the strap receptacle 112; and couple her mobile device to a mount without obstruction by the strap 120.

In one implementation, the device case body 110 can include: the insert 130 arranged in a first region of the device case body 110 proximal a center of the exterior face of the device case body 110; and the strap receptacle 112—coupled to the strap 120—arranged in a second region below the first region (e.g., in a plane defined by the device case Dm). By including the insert 130 proximal the center of the device case body 110—and therefore proximal a center of gravity of the device case 100—the device case 100 can couple to a mount (approximately) at this center of gravity and therefore exhibit limited torque on the mount, thus enabling the device case 100 and a mobile device housed within the device case 100 to balance on the mount.

In another implementation, the device case body 110 can include: the insert 130 arranged in a first region of the device case body 110 proximal a charge receiving element of the mobile device housed within the device case body 110; and the strap receptacle 112—coupled to the strap 120—arranged in a second region below the first region (e.g., in a plane defined by the device case Dm). By including the insert 130 proximal the charge receiving element of the mobile device, the device case 100 enables better wireless power transfer between a charging element of a mount coupled to the device case 100 and the charge receiving element of the mobile device by locating the charge receiving element within a threshold distance of the charging element when the device case 100 is coupled to the mount.

7.1 Example: Strap+Mount

For example, the user may: place her mobile phone on a mount in her vehicle as she drives to the store; remove the mobile phone from the vehicle mount when she arrives; deploy the strap 120 to securely and effortlessly hold her mobile phone as she shops and checks items off of her grocery list saved on her mobile phone; remove her finger from the strap 120—automatically triggering the strap 120 to return to the retracted position within the strap receptacle 112 of the device case body—to replace her mobile phone back on the mount in her vehicle as she drives back home. Later, before going to bed, the user may: deploy the strap 120 into the deployed position to read from her mobile phone; remove her finger from the strap 120—returning the strap 120 to the retracted position—and couple her mobile phone to a mount on her nightstand configured to charge her mobile phone. Therefore, the user may both deploy the strap 120 when convenient to the user for added security and comfort and transition her mobile phone—housed within the device case—between a suite of mounts (e.g., with the strap 120 in the retracted position), all while using only one hand.

8. Variation: Adapter

In one variation, as shown in FIGS. 9A-10J, the strap 120 can form a strap adapter configured to transiently couple and decouple from any mobile device (e.g., smartphone, tablet), any generic device case, and/or any generic handheld electronic device. In this variation, the strap adapter can include: an adapter body including the strap receptacle 112 configured to transiently house the strap 120; and the strap 120 coupled to the adapter body. The strap adapter can include an adhesive coating applied to an inner face of the adapter body configured to couple the strap adapter to a surface of a mobile device and/or mobile device case 100.

In one implementation, the strap adapter includes: the insert 130 integrated into the adapter body and configured to transiently couple to a mount; the strap receptacle 112 configured to transiently house the strap 120; and the strap 120 coupled to the adapter body and configured to transition between the deployed position and the retracted position. For example, the strap adapter can define a rectangular body including: the insert 130 arranged within a first region of an exterior face of the rectangular body and configured to couple to a polygonal boss of the mount; and the strap receptacle 112 arranged within a second region of the exterior face of the strap receptacle 112 and configured to transiently house the strap in the retracted position. The strap adapter can also include: a first set of magnetic elements 134 arranged about the insert 130 and configured to transiently couple to a second set of magnetic elements of the mount to drive the mount toward to the strap adapter (e.g., to drive the polygonal boss of the mount into the insert 130 of the adapter body) and to retain the polygonal boss within the insert 130; and a first set of magnetic features 116 arranged across the base surface of the strap receptacle 112 and configured to transiently couple to a second set of magnetic features 126 of the strap to drive the strap into the strap receptacle 112 from the deployed position toward the retracted position and to retain the strap within the strap receptacle 112. The strap adapter can include an adhesive coating on an inner face opposite the exterior face of the adapter body, such that the user may remove a protective film from this inner face and stick the inner face of the adapter body to her mobile device (e.g., her smartphone) or a case configured to house her mobile device.

9. Variation: Kickstand

In one variation, the strap 120 can be configured to serve as a kickstand for the device case 100 and therefore maintain an orientation (e.g., landscape or portrait) of the device case 100 relative a surface (e.g., a table, a floor) on which the user rests her mobile device. For example, a user may open the strap 120 into the deployed position, and rest the third strap section against a surface of her desk to maintain her mobile phone—housed within the device case 100—in a portrait orientation. In another example, a user may open the strap 120 into the deployed position, and rest a side (e.g., defining a plane orthogonal a plane of the device case wo) of the strap 120 against the surface of her desk to maintain her mobile phone in a landscape orientation.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A device case comprising:
 a device case body:
  configured to accept and retain a mobile device;
  defining a strap receptacle; and
  including a first set of magnetic features arranged across a base surface of the strap receptacle; and
 a strap:
  coupled to the device case body;
  configured to seat within the strap receptacle in a retracted position;
  configured to accept a finger of a user in a deployed position; and
  including a second set of magnetic features configured to transiently couple to the first set of magnetic features to drive the strap from the deployed position to the retracted position and to retain the strap within the strap receptacle in the retracted position.

\* \* \* \* \*